United States Patent [19]
Windsor

[11] 3,831,647
[45] Aug. 27, 1974

[54] CLAMPING AND SHEARING HEAD FOR A TREE HARVESTER

[75] Inventor: Robert N. Windsor, Brisbane, Australia

[73] Assignee: Eaton Yale Ltd., Woodstock, Ontario, Canada

[22] Filed: Aug. 10, 1973

[21] Appl. No.: 387,556

[52] U.S. Cl. ......... 144/34 E, 144/3 D, 144/309 AC
[51] Int. Cl. ............................................ A01g 23/08
[58] Field of Search ............ 144/2 R, 2 Z, 3 R, 3 D, 144/34 R, 34 E, 309 AC

[56] References Cited
UNITED STATES PATENTS
3,294,131 12/1966 Larson .......................... 144/3 D X
3,727,653 4/1973 Tucek ............................. 144/34 E Primary Examiner—Andrew R. Juhasz
Assistant Examiner—W. Donald Bray
Attorney, Agent, or Firm—Teagno & Toddy

[57] ABSTRACT

A clamping and shearing head for a tree harvester employing a single pair of actuating cylinders for clamping and shearing. The piston rod of each cylinder acts directly on a shear blade while the cylinder body acts on a tree clamp member through a trunnion mount and bellcrank arrangement. As the shear blade closes against a tree the reaction forces on the cylinder body, acting through the trunnion mount, cause the bellcrank to rotate to close the clamp member against the tree. Once the clamp has closed on the tree the piston rod continues to extend to move the shear blade through the tree trunk.

5 Claims, 4 Drawing Figures

CLAMPING AND SHEARING HEAD FOR A TREE HARVESTER

This invention relates to improvements in tree harvesters and more particularly to an improved clamp and shear assembly for a tree harvester.

A known type of tree harvester includes a clamping and cutting head carried by a frame extending from a prime mover. The clamping and cutting head includes a central rear body part to which are pivoted, about laterally spaced parallel axes, a pair of clamp jaws, which may be spread apart hydraulically so that the body may be brought against a tree trunk, after which the two clamp jaws are hydraulically swung towards each other to embrace the tree trunk. These jaws are so made that when swung towards each other, one fits closely within the other, and each has upper and lower serrated sections for firmly gripping and holding the tree trunk.

When the tree trunk is so held, a pair of shears carried by the clamping and cutting head are brought into operation to sever the tree trunk below the clamp jaws. The shears are pivoted at their rear, about transversely spaced parallel axes, to the body of the clamping and cutting head, and hydraulic means are provided for bringing them pivotally apart, to receive a tree trunk, or towards each other to sever the tree trunk between them.

The principal object of the present invention is to provide, for a tree harvesting apparatus of this general type particularly simple but efficient means for actuating the clamp jaws and the shears of the clamping and cutting head.

Another object of the invention is to provide integral means for actuating both the clamp jaws and shears of the clamping and cutting head.

Another object of the invention is to provide means for actuating the clamp jaws and shears of the clamping and cutting head in which one function is effected by the direct action of one or more hydraulic motors while the other function is effected by the reaction of the hydraulic motor(s) in effecting the first function.

In order to meet the above objections the present invention provides a clamping and cutting head for a tree harvester, of the type having a frame, a pair of clamps pivoted to the frame for clamping a tree trunk, a pair of shears pivoted to the frame for cutting the tree trunk below the clamps, and actuating means for moving each clamp and the corresponding shear to or from operative position in which the actuating means for each clamp and the corresponding shear includes a hydraulic cylinder operatively connected to the clamp, with the piston of the hydraulic cylinder being operatively connected to the shear in such manner that when the piston is extended it urges the shear to operative position and reaction causes the cylinder so to move as to urge the clamp to operative position.

Other objects and advantages of the invention will become more apparent from the following description when taken in connection with the accompanying drawings, wherein.

Figure 1:
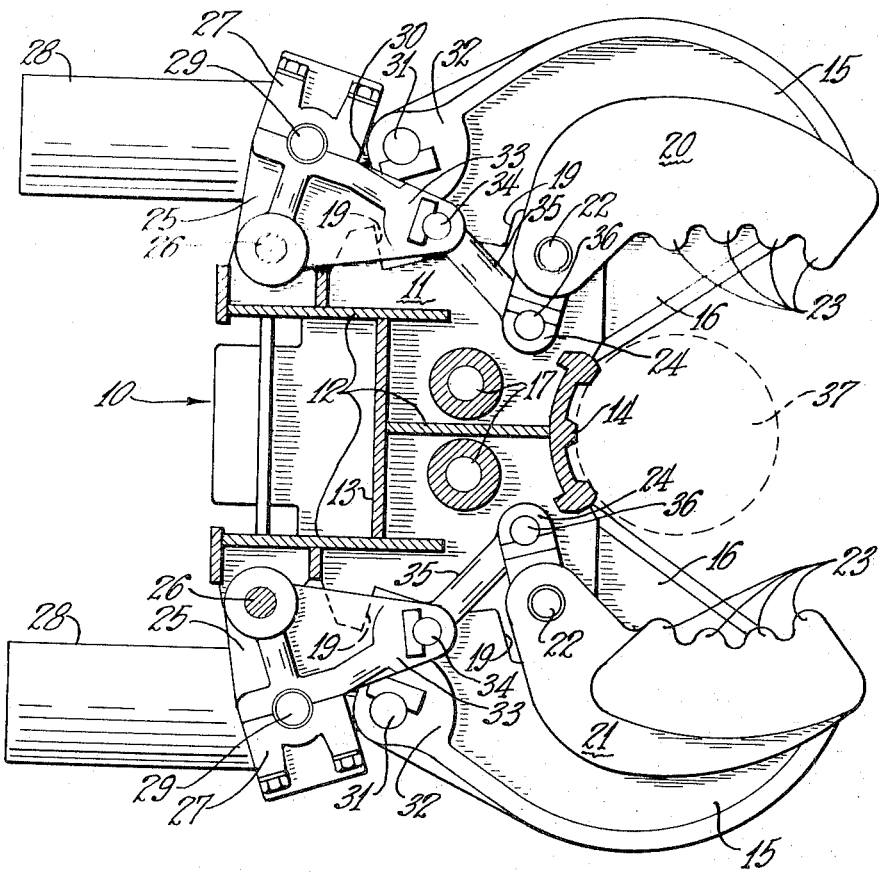
FIG. 1 is a partly sectioned plan view of a clamping and cutting head according to the invention, shown in the open position.

The clamping and cutting head shown in the drawings is made for attachment to the articulated arm or frame (not shown) pivoted to and extending forwardly from the prime mover (not shown) of a known type of tree harvester, having means whereby the clamping and cutting head may be raised, lowered, swung to one side or the other, and tilted, as may from time to time be required.

The clamping and cutting head includes a main frame indicated generally at 10, and having a bottom plate 11, a generally similar top plate (not shown) spaced thereabove, and an assembly of longitudinal plates 12 and transverse plates 13 rigidly interconnecting the two. An upright stop plate 14, curved arcuately in plan view and with vertical serrations or teeth extending from its front or concave face interconnects the central front parts of the top and bottom plates of the main frame 10.

The two shears 15 are oppositely arranged but otherwise similar, each consisting of a sturdy curved arm within the curve of which there is secured a semi-circular blade 16, its straight side being sharpened to a cutting edge. The two shears are disposed below the main frame bottom plate 11, and they are provided with integral upwardly extending parallel pivots 17 rotatable in the top and bottom plates of the main frame 10.

Each of the shears has an integral stop block 18 (see FIG. 4) movable between a pair of stops 19 on the main frame bottom plate 11, which limit the pivotal movement of the shear in both directions. When the shears are brought together to full extent, the cutting edges of their blades meet or closely approach.

The two clamps 20 and 21 are generally similar, each consisting of similar upper and lower plates curved in plan view and interconnected by integral intermediate members (not shown). The rear end portions of the two clamps are pivoted between the top and bottom plates of the main frame 10 about pivots 22 which are parallel to, but in front of, and more widely spaced than, the shear pivots 17. Clamp 20 is of lesser depth than clamp 21, and when the two clamps are swung pivotally towards each other, the front part of clamp 20 may pass between the upper and lower plates of clamp 21. Both clamps are provided with teeth or serrations 23 extending from the near or concave faces of their upper and lower plates. Formed integrally with each of the clamps 20 and 21 is a clamp actuating lever 24 extending radially from the clamp pivot 22.

To each side of the rear part of the main frame 10 a bellcrank 25 is fulcrumed between the main frame top and bottom plates by a fulcrum pin 26, parallel to the pivots of the shears and clamps. An outwardly extending arm 27 of each bellcrank is formed with an opening in which is located the front part of a hydraulic cylinder 28, forming a trunnion mount for the cylinder. Upper and lower bearings are located in the arm 27 to receive coaxial trunnions 29 extending from the cylinder. The piston 30 of the hydraulic cylinder is pivotally attached to the shears at 31 between a pair of integral upper and lower lugs 32 extending from the appropriate shears. A forwardly extending arm 33 of each bellcrank has pivoted thereto at 34 the rear end of a connecting rod 35 which at its front end is connected by a pivot 36 to the actuating lever 24 of the appropriate clamp 20 or 21.

The two hydraulic cylinders 28 are connected to the hydraulic system of the tree harvester in a conventional manner for simultaneous operation.

In the operation of the tree harvesting machine, the clamping and cutting head is advanced to a tree trunk, as indicated at 37, the shears 15 and the clamps 20 and 21 being in open positions, as shown in FIG. 1, until the stop plate 14 is brought against the tree trunk.

Figure 2:
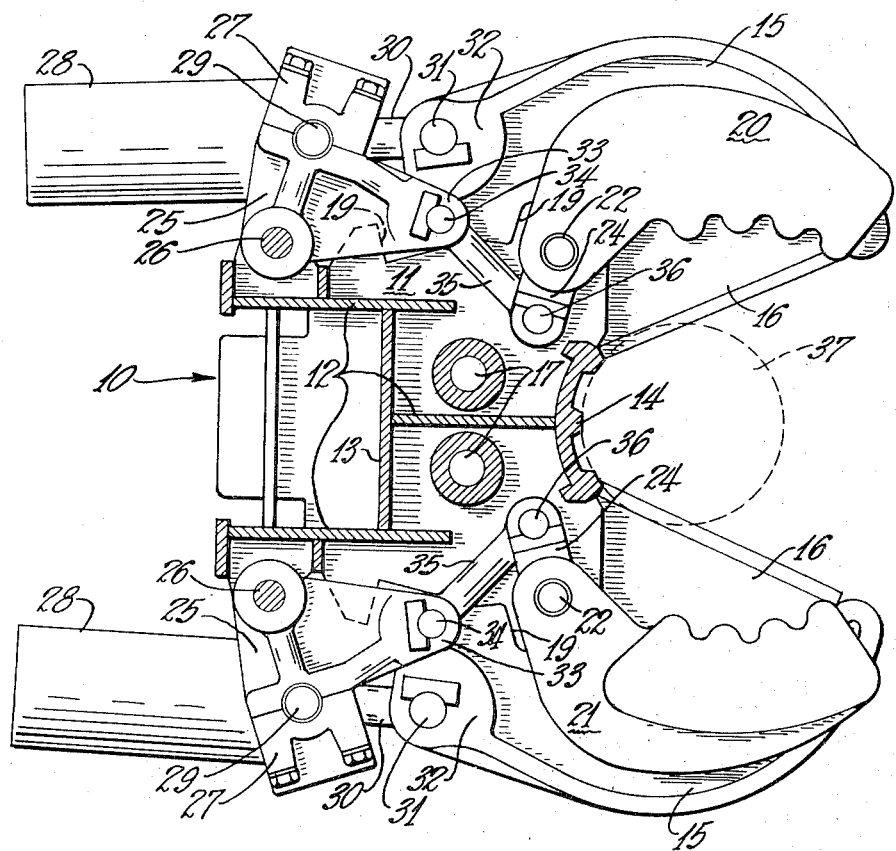
FIG. 2 is a view similar to FIG. 1 showing the cutting shears of the invention brought into contact with a tree trunk.
Figure 3:
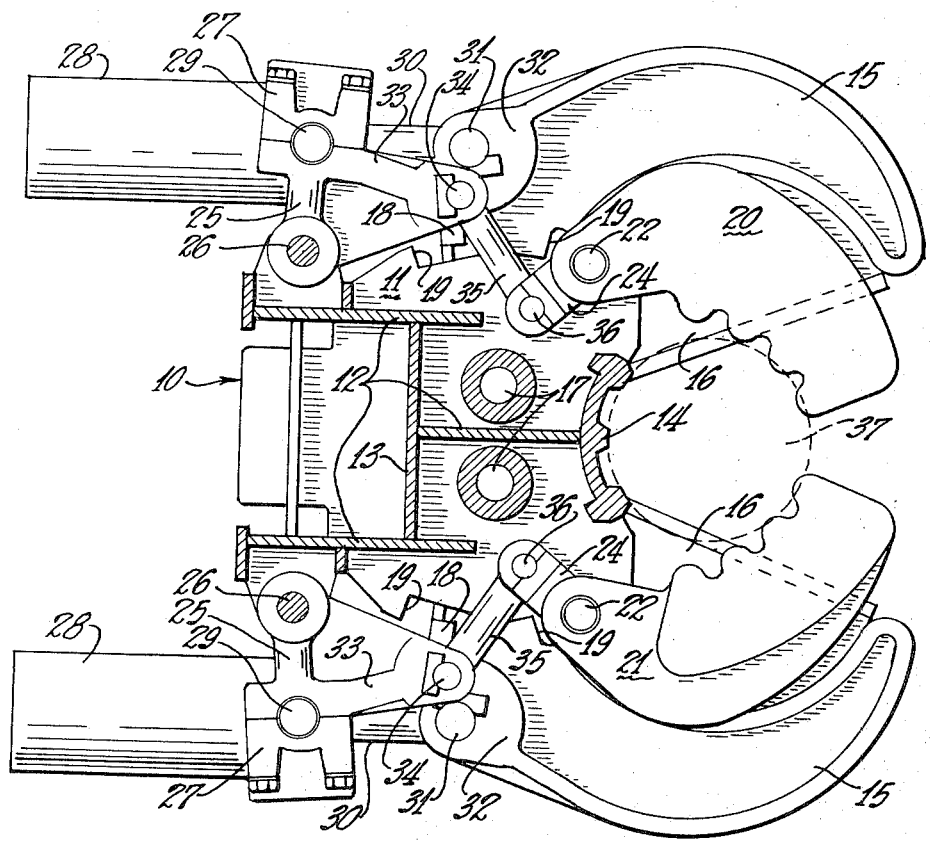
FIG. 3 is a view similar to FIGS. 1 and 2, showing the clamp arms brought to operative position gripping the tree trunk.

The two hydraulic cylinders 28 are then simultaneously operated so that their pistons 30 are extended, as shown in FIG. 2, to bring the two shears 15 to the tree trunk 37. The reactive force on the two cylinders 28 through the trunnions 29 causes the bellcranks 25, to which they are pivoted, to rotate outwardly, as shown in FIG. 3, thus acting through the connecting rods 35 to move the clamps 20 and 21 towards each other, to grip the tree trunks 37 firmly between their serrated faces and the serrated stop plate 14.

Figure 4:
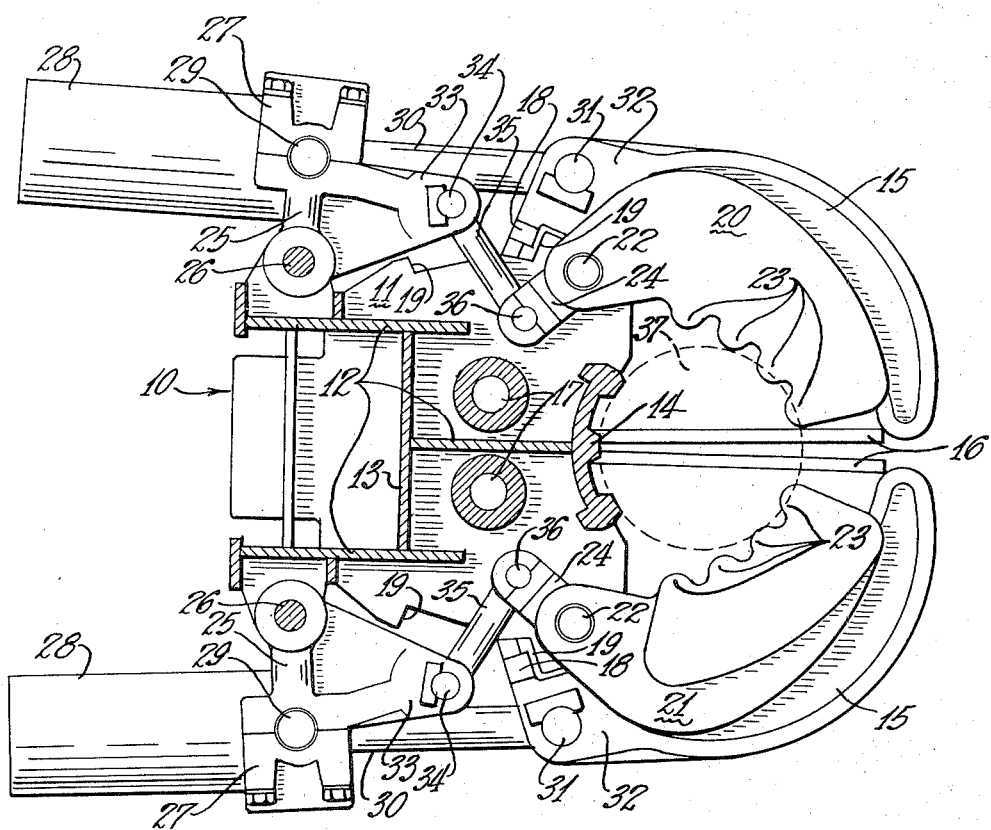
FIG. 4 is a view similar to the preceding views showing the tree trunk gripped by the clamp arms and almost completely severed by the shears.

The clamps 20 and 21 engaging the tree trunk and being thus prevented from further significant pivotal movement towards each other, further extension of the cylinder pistons 30, as shown in FIG. 4, causes the two shears 15 to move pivotally towards each other, so that the cutting edges of their blades are finally brought together to sever the tree trunk below the clamps 20 and 21 which continue to hold the trunk firmly. The tree trunk, held by the clamps, may be moved where required by the articulated arm of the tree harvester before being freed, by causing the pistons 30 of the hydraulic cylinders 28 to be retracted, to move the shears 15 and clamps 20 and 21 to open or inoperative position.

Tree harvester clamping and cutting heads according to the invention will be found to be very effective in achieving the objects for which they have been devised. It will, of course, be understood that modifications of constructional detail and design, which will be readily apparent to skilled persons, may be made within the ambit of the invention hereinafter claimed.

I claim:

1. In a clamping and cutting head for a tree harvester, of the type having a frame, a pair of clamp members pivoted to the frame for clamping a tree trunk, a pair of shear members pivoted to the frame for cutting the tree trunk below the clamp members, and actuating means for moving each clamp member and the corresponding shear member to or from operative position; the improvement in which the actuating means for each clamp member and the corresponding shear member includes a hydraulic cylinder operatively connected directly to one of said members and by means of a linkage to the other of said members in such manner that when the piston of said hydraulic cylinder is extended the directly connected member is urged to operative position and reaction forces acting through said linkage cause the cylinder so to move as to urge the other member to operative position.

2. A clamping and cutting head according to claim 1 in which the piston of said hydraulic cylinder acts directly on said shear member and said clamp member is operatively connected to the cylinder through said linkage.

3. A clamping and cutting head according to claim 2 in which said cylinder is pivotally connected to a first arm of a bellcrank fulcrumed on the frame, and a second arm of the bellcrank is connected by a connecting rod to the clamp member.

4. A clamping and cutting head according to claim 3 in which said first arm of said bellcrank defines a trunnion mount for said cylinder, said cylinder including a pair of coaxial trunnions extending from said cylinder body and receivable in said trunnion mount.

5. A clamping and cutting head for a tree harvester including a frame adapted to be mounted on the front of an articulated arm of a tree harvester, a pair of shear members mounted below said frame for pivotal movement about parallel adjacent axes, the said shear members having oppositely directed cutting edges which are brought together when the shear members are moved to operative position; a pair of clamp members mounted above the shear members for pivotal movement about axes parallel to the pivots of the shear members; a pair of bellcranks fulcrumed to both sides of the frame, each bellcrank having a first outwardly extending arm and a second forwardly extending arm; a hydraulic cylinder pivoted to the first arm of each bellcrank, the piston of said cylinder pivoted to the corresponding shear member; and a connecting rod connecting the second arm of each bellcrank to the corresponding clamp member in such manner that when said pistons are extended simultaneously from the hydraulic cylinders the pistons move the shear members towards operative position and reactive forces on the cylinders cause the bellcranks so to move as to pivot the clamp members towards each other.

* * * * *